(12) United States Patent
Hayes et al.

(10) Patent No.: US 8,612,572 B2
(45) Date of Patent: Dec. 17, 2013

(54) RULE-BASED SYSTEM FOR CLIENT-SIDE QUALITY-OF-SERVICE TRACKING AND REPORTING

(75) Inventors: Matthew Terence Hayes, Milpitas, CA (US); Eric Lynn Eilebrecht, Woodinville, WA (US); Anastasios Kasiolas, San Francisco, CA (US); Marcus J. Jager, Boulder Creek, CA (US); Marc Andrew Power, San Jose, CA (US); Steven Robert Sandke, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 12/130,484

(22) Filed: May 30, 2008

(65) Prior Publication Data

US 2009/0299940 A1    Dec. 3, 2009

(51) Int. Cl.
*G06F 15/16* (2006.01)
*G06F 15/173* (2006.01)

(52) U.S. Cl.
USPC ............ 709/224; 709/203; 709/217; 709/223

(58) Field of Classification Search
USPC .................. 709/201–203, 217–219, 223–226
See application file for complete search history.

(56) References Cited

U.S. PATENT DOCUMENTS

| | | | |
|---|---|---|---|
| 6,003,079 A | 12/1999 | Friedrich | |
| 6,154,778 A | 11/2000 | Koistinen | |
| 6,308,216 B1 | 10/2001 | Goldszmidt | |
| 6,871,233 B1 | 3/2005 | Bearden | |
| 7,185,070 B2 | 2/2007 | Paul | |
| 7,376,969 B1 * | 5/2008 | Njemanze et al. | 709/224 |
| 7,418,497 B2 * | 8/2008 | Hagale et al. | 709/224 |
| 7,548,969 B2 * | 6/2009 | Tripp et al. | 709/223 |
| 7,613,126 B1 * | 11/2009 | Natarajan et al. | 370/252 |
| 8,090,621 B1 * | 1/2012 | Chakrabarti et al. | 705/26.1 |
| 2002/0016839 A1 * | 2/2002 | Smith et al. | 709/224 |
| 2002/0056004 A1 * | 5/2002 | Smith et al. | 709/203 |
| 2002/0143911 A1 | 10/2002 | Vicente | |
| 2004/0210670 A1 * | 10/2004 | Anerousis et al. | 709/224 |
| 2005/0198262 A1 | 9/2005 | Barry | |
| 2006/0159017 A1 | 7/2006 | Mun | |
| 2007/0030853 A1 | 2/2007 | Rogers | |
| 2007/0239820 A1 | 10/2007 | Zhong | |
| 2008/0301284 A1 * | 12/2008 | Demarest et al. | 709/224 |
| 2011/0219099 A1 * | 9/2011 | Smith et al. | 709/219 |

OTHER PUBLICATIONS

Nahrstedt, Klara, et al., QoS-Aware Middleware for Ubiquitous and Heterogeneous Environments; Department of Computer Science, University of Illinois; http://www.eecg.utoronto.ca/~bli/papers/CommMag01.pdf.

(Continued)

*Primary Examiner* — Ian N Moore
*Assistant Examiner* — Jenee Alexander
(74) *Attorney, Agent, or Firm* — Shook Hardy & Bacon LLP (57) ABSTRACT

Server-side control of client-side quality-of-service tracking is provided. When an event occurs at a client, a measurement client collects event parameters and generates aggregated measurement data in accordance with aggregation rules that are provided to the measurement client from a server-side measurement service. The measurement client periodically reports the aggregated measurement data to the measurement service for storage and analysis.

20 Claims, 11 Drawing Sheets

(56) References Cited

OTHER PUBLICATIONS

Bellavista, Paolo, et al., QoS-Aware Accounting in Mobile Computing Scenarios; Department of Electronic Information, University of Bologna; http://zeus.elet/polimi.it/is-manet/Documenti/pap-deis-15.pdf.

Intermon, Information Society Technologies, Specification of Inter-Domain Data Base with Policy-Controlled Data Collection; http://www.ist-intermon.org/download/Deliverable_5.pdf.

Jurca, Racu, et al., Reliable QoS Monitoring Based on Client Feedback; http://www2007.org/papers/paper420.pdf.

* cited by examiner

RULE-BASED SYSTEM FOR CLIENT-SIDE QUALITY-OF-SERVICE TRACKING AND REPORTING

BACKGROUND

Distributed systems, including server farms, web services, and the like, have become increasingly common to provide vast amounts of computing resources. For example, such systems may be utilized to provide a wide variety of services, such as to store and retrieve data (e.g., a storage system), process financial data, route and store email, communicate instant messages, provide authentication services, and output web pages, to name a few. As the amount of computing resources desired to provide these services increases, distributed systems may be "scaled out" by adding additional computing devices thereby providing a flexible topology in which additional resources may be added as-needed.

It is often desirable to measure quality of service (QoS) and other metrics in such distributed systems to obtain an understanding of how the distributed systems are operating and identify performance, availability, and responsiveness issues within the systems. Today, most distributed systems focus on measuring QoS on the server side. QoS is very subjective, and QoS measured at the server typically does not accurately reflect the QoS experienced by a client. Client libraries for distributed storage systems can be complex. For instance, a single call to an API method may result in multiple requests to one or more servers. QoS experienced by the client therefore reflects the quality of the distributed system as a whole, not that of a single server. Another problem with tracking QoS at the server is that the data will not reflect issues with the client library itself which is used for accessing the distributed system. Performance issues or bugs in the client library will reflect negatively on the perceived QoS of the distributed system; however, the server is unaware of these client-side issues.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to server-side control of client-side tracking of quality of service (QoS) and other aggregate data measurements. In an embodiment, a measurement client is provided at a client to track QoS and other aggregated measurement data for events occurring at the client. The measurement client collects aggregate measurement data based on rules provided to the measurement client from a server-side measurement service. The rules specify how event parameters from events should be manipulate to generate the aggregate measurement data. The measurement client may periodically refresh the current set of aggregation rules it has by downloading from the measurement service. The measurement client provides the aggregate measurement data to the measurement service for storage.

BRIEF DESCRIPTION OF THE DRAWINGS

The present invention is described in detail below with reference to the attached drawing figures, wherein:

FIGS. 4 through 7C are flow diagrams illustrating examples of aggregation rules in accordance with an embodiment of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for, among other things, server-side control of the collection, manipulation, and reporting of aggregated measurement data for events occurring at a client device. The client events involve interaction between the client and a distributed system. In accordance with embodiments, a variety of event parameters (i.e., data associated with the events) are collected and manipulated to generate aggregated measurement data. As used herein, the term "aggregated measurement data" refers to data regarding client events (i.e., "event parameters") that has been collected and manipulated in accordance with aggregation rules. Aggregated measurement data includes quality of service (QoS) metrics, as well as other types of information about client events. As used herein, "aggregation rules" include rules specifying which event parameters are collected and how the event parameters are manipulated to generate aggregated measurement data. The manipulation of the event parameters in accordance with aggregation rules is not limited to aggregation of data but may involve a variety of other forms of operations, including filtering, sampling, and other types of data transformation of the event parameters. Generally, the aggregation rules specify some processing to be performed on event parameters collected from an event.

In embodiments, a measurement client is provided that allows data to be measured and aggregated for events at the client and reported to a server. A server-side measurement service publishes aggregation rules to the measurement client to direct the measurement client regarding how aggregated measurement data is collected from these events at the client. The measurement client collects event parameters and generates the aggregated measurement data based on the server-provided rules. The measurement client reports the aggregated measurement data to the measurement service. The server may then send the aggregated measurement data to another service for storage, such as in a database, where data mining can be performed on the aggregated measurement data. Since aggregation and/or other data manipulation is performed at the client, there is less data that needs to be sent from the client to server and less work for data mining applications to perform. Additionally, if new or different rules are required, the rules may be updated at the measurement service and provided to the measurement client, which processes subsequent events based on the updated rules. This allows servers to remotely reconfigure clients to start reporting new data or to alter the way data is reported. Additionally, this allows multiple versions of a client to report on the same type of events, even if different versions collect different data about that type of event.

In some embodiments, the measurement service is capable of selectively sending rules to clients based on the version of the client and/or an IP address of the client. The latter allows rules to be tested on a subset of clients in order to verify there are no issues with the rules. The former allows aggregations to be disabled for some events or entirely in clients, for instance, if a bug is detected in a particular version which is related to event aggregation.

Accordingly, in one aspect, an embodiment of the present invention is directed to a method for tracking, at a client device, aggregated measurement data regarding interaction between the client device and a distributed system. The method includes identifying the occurrence of an event at the client device, the event involving interaction between the distributed system and the client device. The method also includes accessing aggregation rules for generating aggregated measurement data for the event, wherein the aggregation rules are provided to the client device from at least one server device. The method further includes collecting event parameters from the event and generating aggregated measurement data based on at least a portion of the event parameters in accordance with the aggregation rules. The method still further includes communicating the aggregated measurement data for server-side storage.

In another aspect of the invention, an embodiment is directed to one or more computer-storage media embodying computer-useable instructions that, when used by a server device, causes the server device to perform a method. The method includes receiving a request from a client device for aggregation rules for generating aggregated measurement data for an event at the client device. The method also includes accessing aggregation rules for the event and communicating aggregation rules to the client device. The method further includes receiving aggregated measurement data for the event from the client device, wherein the client device generated the aggregated measurement data based on event parameters collected from the event and in accordance with the aggregation rules. The method still further includes storing the aggregated measurement data.

A further embodiment of the present invention is directed to a system providing client-side event tracking. The system includes at least one server device and at least one client device. The at least one server device includes a measurement service that has access to aggregation rules for generating aggregated measurement data at a client device and a reporting period specifying a frequency with which aggregated measurement data is reported. The at least one client device includes an event producer comprising an application or library that produces an event involving interaction with a distributed system. The event has an event service name. The at least one client device also includes a measurement client for tracking aggregated measurement data associated with the event from the event producer. The measurement client uses DNS to resolve the event service name and identify the server device and communicates with the measurement service to access the aggregation rules. The measurement client also collects event parameters from the event and generates aggregated measurement data from the event parameters in accordance with the one or more aggregation rules. The measurement client further communicates the aggregated measurement data to the measurement service based on the reporting period in the event configuration.

Figure 1:
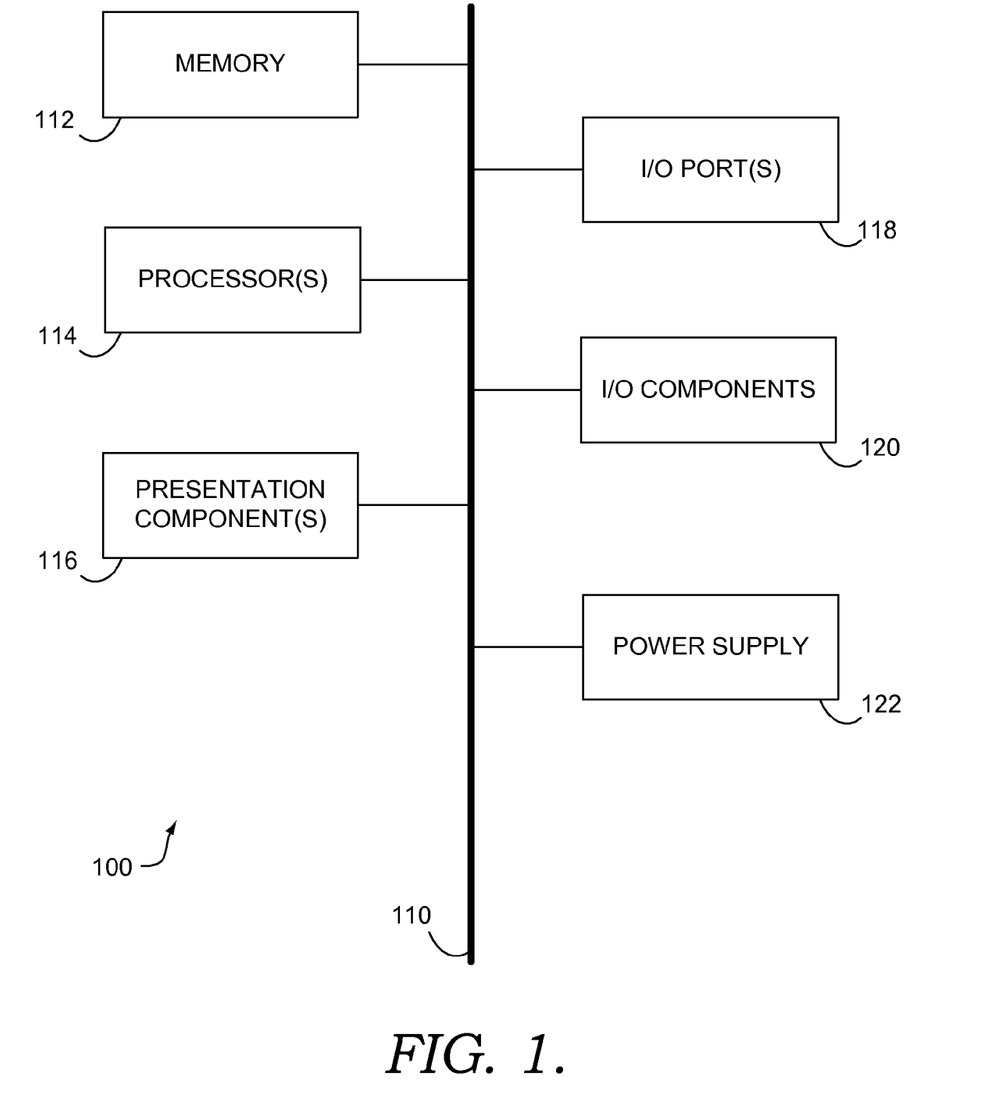
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
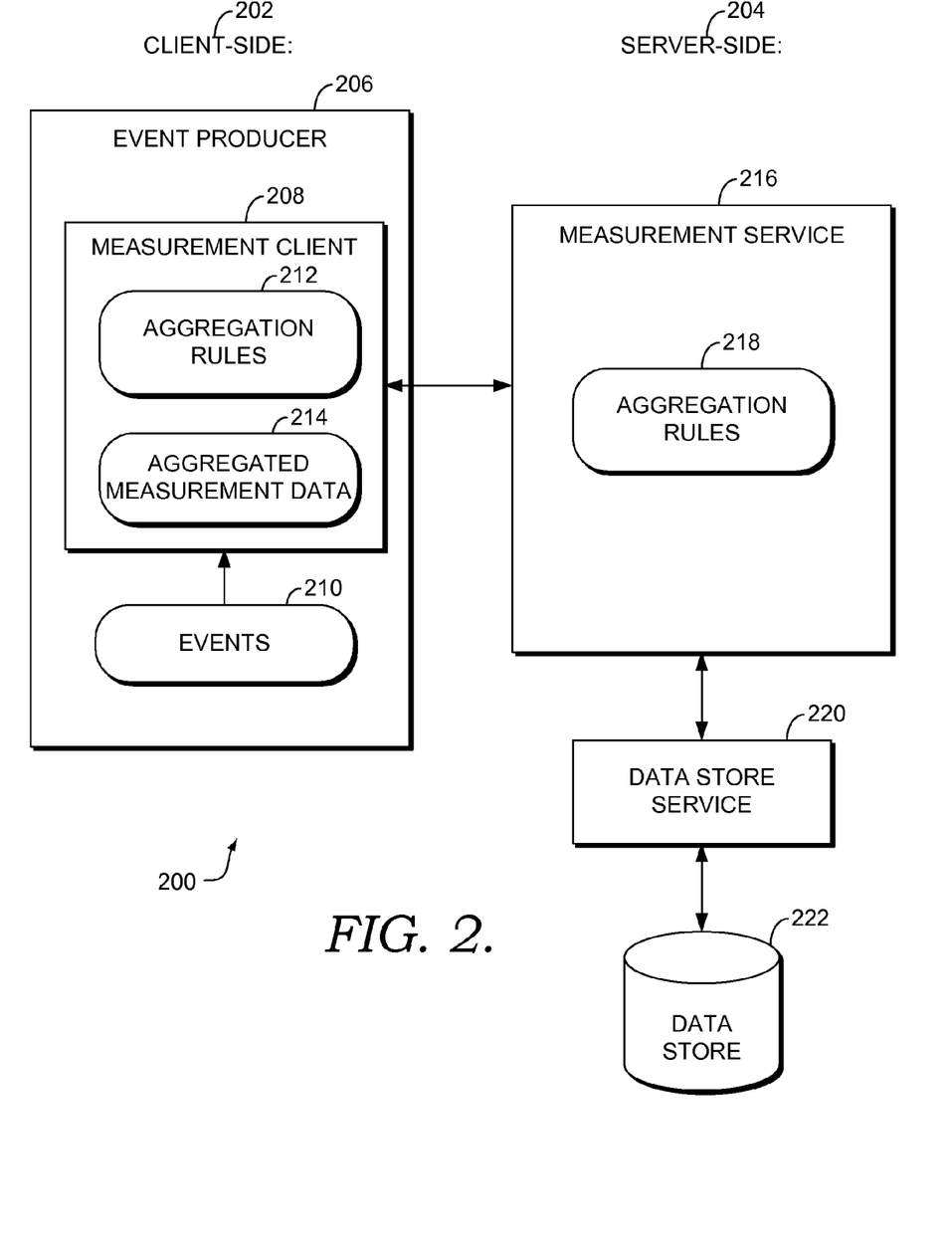
FIG. 2 is a block diagram of a client-side quality-of-service tracking system in accordance with an embodiment of the present invention.

Referring now to FIG. 2, a block diagram is provided illustrating an exemplary system 200 in which embodiments of the present invention may be employed. The components of the system 200 may reside on computing devices of any type, such as computing device 100 described with reference to FIG. 1, for example. Additionally, the components of the system 200 may communicate with each other via a network, which may include, without limitation, one or more local area networks (LANs) and/or wide area networks (WANs). Such networking environments are commonplace in offices, enterprise-wide computer networks, intranets, and the Internet. It should be understood that the system 200 may include any number of components and is not limited to the components shown in FIG. 2.

The system 200 illustrates a client-side aggregated measurement data collection architecture in accordance with one embodiment of the present invention. It should be noted that the system 200 is provided for illustrative purposes only and embodiments of the invention include variations from the architecture shown in FIG. 2. The system 200 includes a client-server relationship including both client-side 202 and server-side 204 components. The client-side 202 components include an event producer 206, which is an application or library that produces events 210 for which QoS and other data is tracked. Events 210 have event parameters, which include any information known about the events 210 by the event producer 206 at the time the events 210 occur. Logically, event parameters may have, for instance, string or floating point values.

The client-side 202 components also include a measurement client 208. The measurement client 208 may comprise a managed library that processes events 210 as they occur to provide QoS and other data tracking. In particular, the measurement client 208 aggregates event parameters from the events 210 into aggregated measurement data 214 according to aggregation rules 212 that are obtained from a measurement service 216 located at the server-side 204. As such, the aggregated measurement data 214 comprises aggregate statistic measurements derived from event parameters in accordance with the aggregation rules 212. By way of example only and not limitation, an aggregated measurement data may be a simple count of the number of occurrences of an event or event parameter, or it may contain information about the value of one of the event parameters (e.g., the average duration of an event). The measurement client 208 also periodically sends the aggregated measurement 214 to the measurement service 216 for storage.

On the server-side 204, the measurement service 216 is responsible for maintaining aggregation rules 218, which includes information used by the measurement client 208 to manipulate event parameters into aggregated measurement data 214 and information used by the measurement service 216 to store the aggregated measurement data 214. The aggregation rules 218 include a data structure describing how to manipulate event parameters from each measurement event. The aggregation rules 218 may specify how event parameters are manipulated to form aggregated measurement data, time intervals over which events are aggregated (i.e., a collection interval), and the frequency with which aggregated measurement data is reported back to the measurement service 216 (i.e., a reporting interval).

The aggregation rules 218 may also include data structures (which may be opaque to the client-side 202 components, so that future server implementations can change these structures) that the measurement service 216 uses to map the client-collected aggregated measurement data 214 to a method of reporting the aggregated measurement data 214 to the datastore service 220. The aggregated measurement data/reporting mapping is included in the aggregation rules 212 provided to the measurement client 208 so that the measurement client 208 can correctly report aggregated measurement data 214 to different server instances that may have different configurations and internal states. In embodiments, the measurement service 216 does not keep a persistent state other than a local configuration file defining the events and their mapping to statistics and curves.

In some embodiments, the measurement service 216 may maintain multiple event configurations for different types of events that may occur in the event producer 206. In other embodiments, the system 200 may include multiple measurement services that provide event configurations for different types of events. In still further embodiments, the measurement service 216 may maintain multiple sets of aggregation rules for different types of event producers. In such embodiments, each set of aggregation rules includes rules for aggregating data for different types of events for a given type of event producer. Any and all such variations are contemplated to be within the scope of embodiments of the present invention.

When an event 210 occurs in the event producer 206, the measurement client 208 attempts to match the event 210 with aggregation rules 212 corresponding with an event type for the event 210. In some instances, the measurement client 208 may have previously obtained the aggregation rules 212 for the event type from the measurement service 216. In other instances, the measurement client 208 has not previously obtained the aggregations rules 212 from the measurement services 216 and must request and receive the aggregation rules 212. In some cases, the measurement client 208 may be configured to request updated aggregation rules from the measurement service 216 at configurable intervals. For instance, the aggregations rules 212 may be periodically updated. Accordingly, the measurement client 208 may be updated with new aggregation rules 212 as they are updated, thereby controlling the aggregated measurement data that is collected by the measurement client 208.

Having matched the event 210 with aggregations rules 212, the measurement client 208 applies the aggregations rules 212 to collect and aggregate event parameters from the event 210 into aggregated measurement data 214, resulting in a set of aggregated measurement data 214 getting updated for each event occurrence.

After aggregated measurement data 214 has been collected by the measurement client 208, the aggregated measurement data 214 is sent to the measurement service 216. In some embodiments, the aggregated measurement data 214 is sent from the measurement client 208 to the measurement service 216 using SOAP. However, many different protocols, such as HTTP, HTTP-REST, TCP and generally any internet-capable protocol, may be used in various embodiments of the invention.

The aggregated measurement data 214 may be communicated from the measurement client 208 to the measurement service 216 at any time within the scope of embodiments of the present invention. In some embodiments, however, the event configuration 218 specifies a reporting interval, and all aggregated measurement data that has been collected by the measurement client 208 during that reporting interval is sent to the measurement service 216 at the end of the reporting interval. In some instances, a reporting interval may include separate collection intervals. Accordingly, a separate collection of aggregated measurement data is reported to the measurement service 216 for each collection interval that occurred during the reporting interval. If the reporting fails, the measurement client 208 saves the data report and adds it to the next reporting attempt. The number of reports that is retained in this fashion before simply discarding them may be defined by the event configuration 218.

In the embodiment shown in FIG. 2, the system 200 includes a datastore service 220 and datastore 222. The datastore service 220 receives aggregated measurement data 214 from the measurement service 216 and stores them in the datastore 222. In various embodiments, the datastore service 220 may be any general storage service. However, a service backed by a database enable more efficient data mining. The datastore 222 is the physical location where the aggregated measurement data 214 is stored. In embodiments, the data does not all necessarily go to the same store. Some of the data may be sent to one store and other data sent to another store. The data may also be stored in different formats at different storage devices based on the type of aggregated measurement data received. For example, some aggregated measurement data could be stored in a SQL database and other aggregated measurement data could be stored in a local log file.

As indicated previously, the client-side aggregated measurement data tracking system of some embodiments may be able to track data for different types of events. Each event type is associated with an event configuration that specifies rules for aggregating event parameters for that event to generate aggregated measurement data. Additionally, in some embodiments, the client-side tracking system may include multiple measurement services that are configured for different event classes. In some embodiments, measurement services are identified by domain name using DNS. Additionally, in some embodiments, each event that corresponds with a given event type is configured with a particular event service name in order to identify the measurement service which provides the aggregation rules and collects the QoS metrics. The event service name may be resolved to one or more measurement service instances using DNS. The event server name may be derived from measurement event parameters or determined by the event producer creating the event. In an embodiment, an event service name identifies PTR records which point to records describing the service, including a set of SRV records identifying the hosts and ports of the servers for the service, and a TXT record containing the relative URI to user when forming requests to the service.

Figure 3:
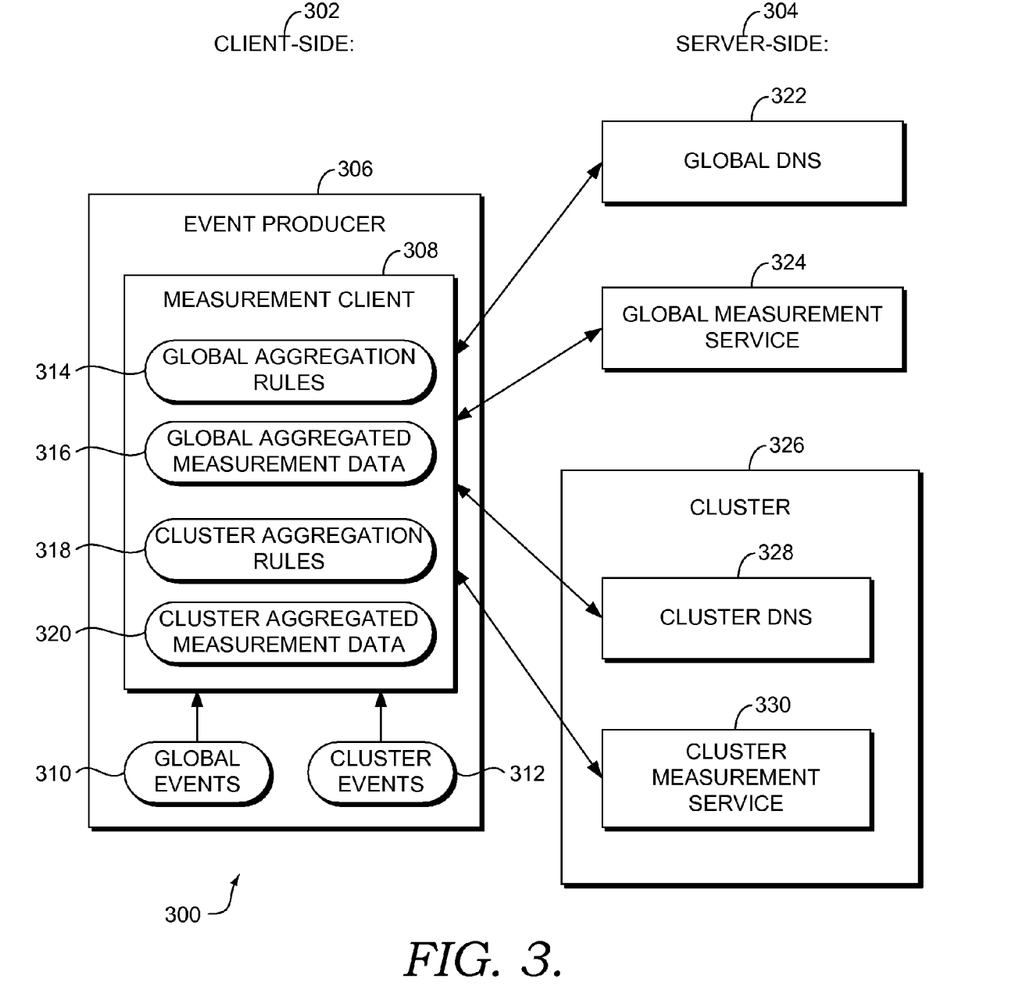
FIG. 3 is a block diagram of a client-side quality-of-service tracking system using global and cluster measurement services in accordance with an embodiment of the present invention.

In some embodiments of the present invention, events may be associated with different server clusters. In such embodiments, each cluster may correspond with a cluster measurement service for events associated with that cluster. In some instances, some events may not be associated with a given cluster. Accordingly, a global measurement service may also be provided for such events that are not associated with any given cluster. For instance, the global measurement service may be used to track measurements about the performance of the measurement service itself, including failures to report measurements associated with clusters. Referring to FIG. 3, a block diagram is provided illustrating a system 300 for client-side tracking in which a cluster measurement service 330 and a global measurement service 324 are employed.

Similar to the system 200 of FIG. 2, the system 300 of FIG. 3 includes a client-side 302 and server-side 304. Additionally, the client-side 302 includes an event producer 306 and a measurement client 308. The event producer 306 produces a number of events including, both cluster events 312 that are associated with a given cluster 326 and global events 310 that are not associated with a given cluster. Although only a single cluster is shown in FIG. 3, it should be understood that a system may include multiple different types of clusters.

Each event corresponds with an event service name that allows the measurement client 308 to identify a corresponding measurement service. For cluster events 312, the measurement client 308 uses cluster DNS 328 to locate the cluster measurement service 330, which includes one or more aggregation rules for the cluster events 312. The measurement client 308 obtains cluster aggregation rules 318 for the cluster events 312, generates cluster aggregated measurement data 320 based on those rules 318, and reports the cluster aggregated measurement data 320 to the cluster measurement service 330.

For global events, the measurement client 308 uses global DNS 322 to locate the global measurement service 324, which includes one or more aggregation rules for the global events 310. The measurement client 308 obtains global aggregations rules 314 for the global events 310, generates global aggregated measurement data 316 based on those rules 314, and reports the global aggregated measurement data 316 to the global measurement service 324.

Aggregation rules may specify the collection and aggregation of QoS metrics and other aggregated measurement data in a variety of different manners within the scope of embodiments of the present invention. In some embodiments, each aggregation rule may include a tree of conditions and nodes with instructions for generating the aggregated measurement data. In such embodiments, the measurement client performs a depth-first traversal of the tree of conditions. For each condition that is satisfied, any nodes with instructions for calculating aggregated measurement data directly attached to that condition are used to generate aggregated measurement data. If additional conditions are attached to a satisfied condition, it is determined whether any of those additional conditions are satisfied. For any condition that is not satisfied, all instructions for aggregating data and conditions under the failed condition are ignored. Accordingly, the measurement client follows paths of satisfied conditions in tree of conditions to identify nodes with instructions to be followed to calculate the aggregated measurement data.

Referring to FIGS. 4 through 7C, block diagrams are provided to illustrate examples of aggregation rules. The examples include basic rules that may be given to a client for an event and have been represented as flow charts to make the rules easier to understand. It will be understood and appreciated by those of ordinary skill in the art that the aggregation rule examples shown in FIGS. 4 through 7C are provided for illustration purposes only and are not intended to limit the scope of the present invention in any way.

In the present examples shown in FIGS. 4 through 7C, a client library interacts with a distributed storage service and has a "GetBlob" event, which is created each time a GET operation is performed on a blob. The storage service stores the blobs, which are identified by a blob name that is unique within a given namespace. The GetBlob event has the following properties: BlobSize, which is the size of the blob in bytes; Duration, which is the amount of time it took to complete the request; and Namespace, which is the namespace the blob is stored in.

Figure 4:
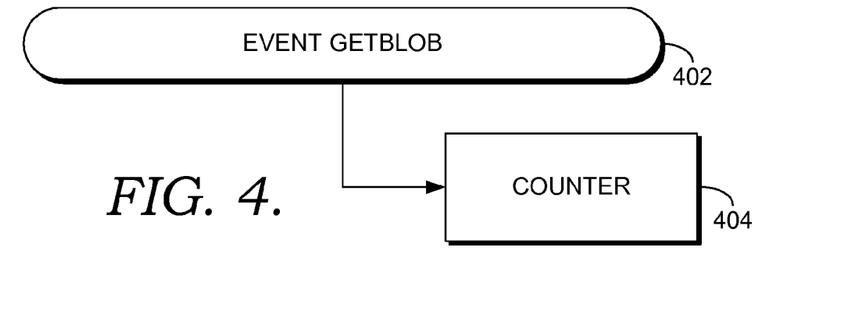

Turning initially to FIG. 4, a simple rule is illustrated for tracking the number of GetBlob events. In particular, each time a GetBlob event 402 is created, a counter 404 is incremented. The measurement client periodically sends the current count to the measurement service, and the count is stored. The event count data may then be used, from the server side, to create reports containing the total number of GetBlob events 402 which happened for a given time period (e.g., per-day, per-week, etc.).

Figure 5:
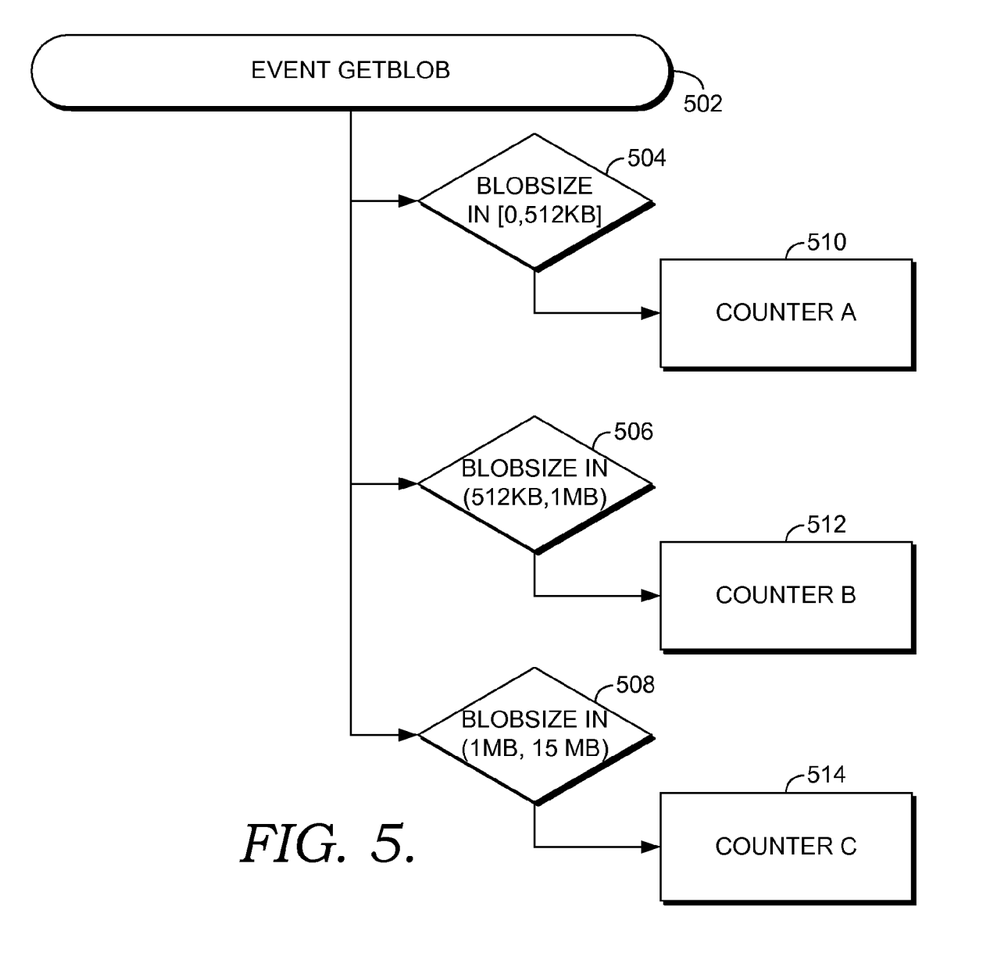

FIG. 5 illustrates a rule for counting the number of GetBlob events 502 that occur within various BlobSize ranges. In particular, each time a GetBlob event 502 occurs that has a BlobSize less than 512 kilobytes, as shown at block 504, counter A 510 is incremented. Each time a GetBlob event 502 occurs that has a BlobSize between 512 kilobytes and 1 megabyte, as shown at block 506, counter B 512 is incremented. Each time a GetBlob event 502 occurs that has a BlobSize between 1 megabyte and 15 megabytes, as shown at block 508, counter C 514 is increment. For instance, if within a single collection interval, a GET was performed for blobs of size 1 kilobyte, 5 kilobytes, 750 kilobytes, 900 kilobytes, 1 megabyte, and 10 megabytes, the total counts for counter A 510, counter B 512, and counter C 514 would be 2, 3, and 1, respectively.

Figure 6A:
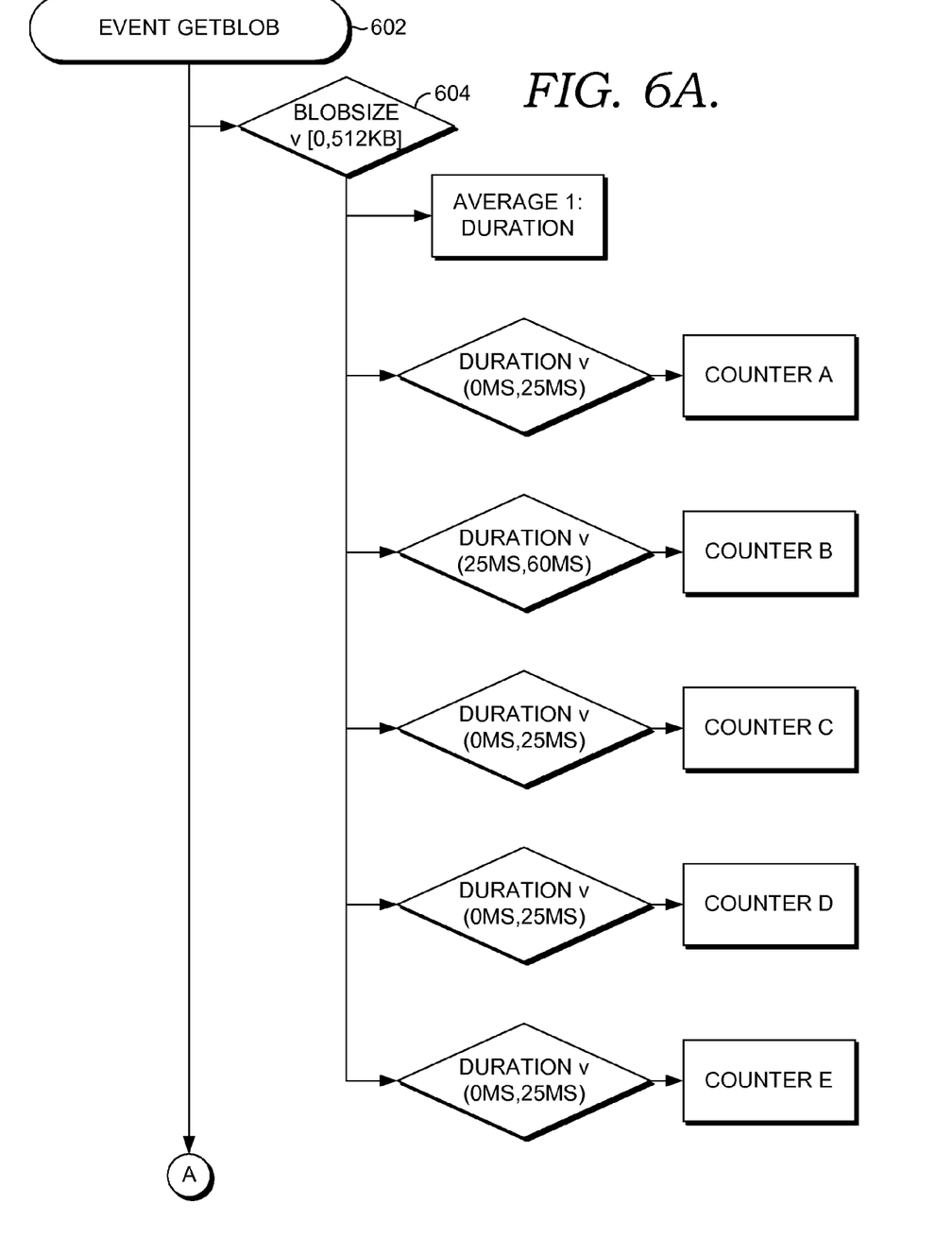
Figure 6B:
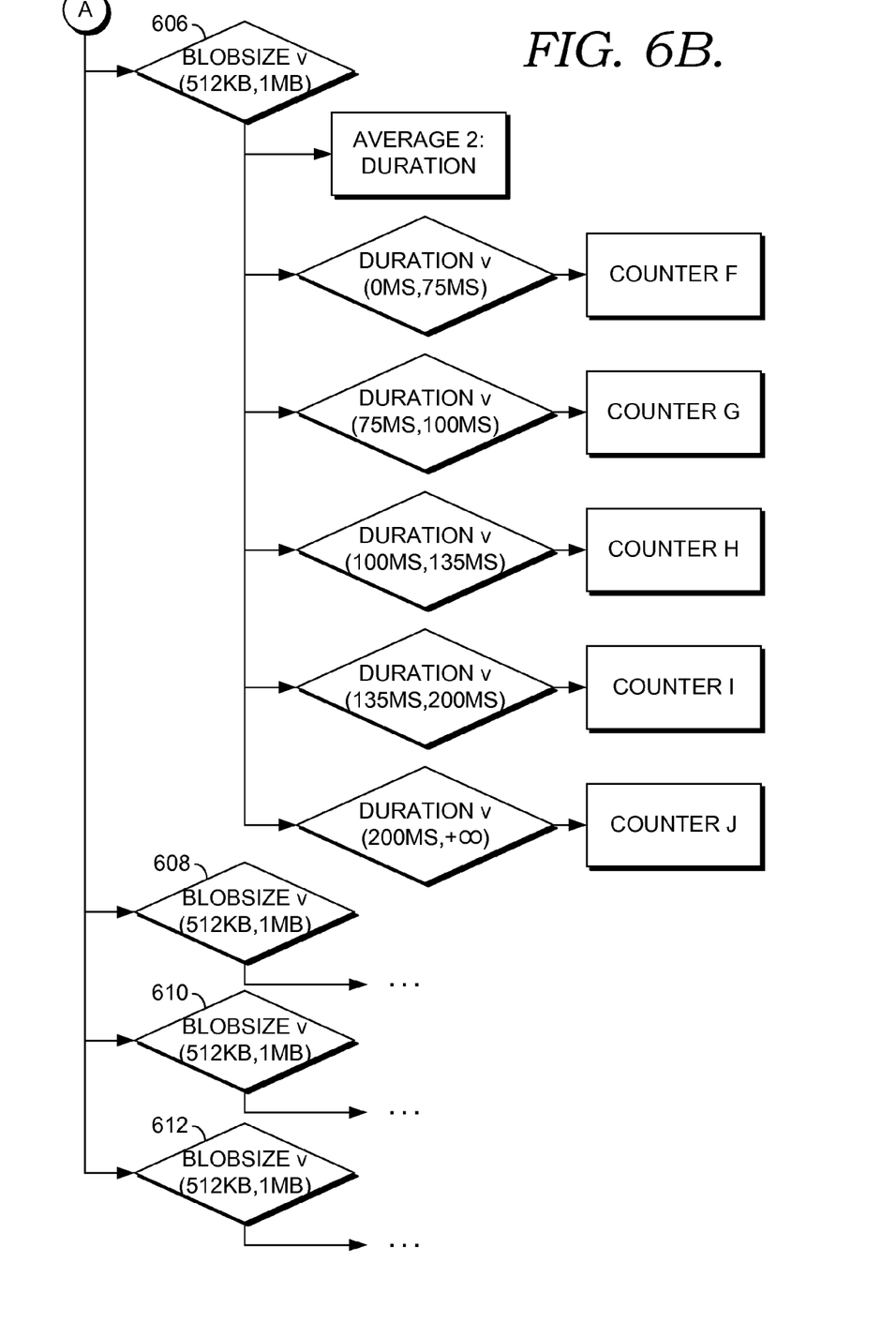

Referring next to FIGS. 6A and 6B, a rule for measuring the responsiveness of the storage service is illustrated. The rule in FIGS. 6A and 6B defines five BlobSize intervals 604, 606, 608, 610, and 612 that may be tracked for GetBlob events 602. For each BlobSize interval, Duration intervals are defined. As shown in FIGS. 6A and 6B, the Duration intervals may vary for each BlobSize interval. In accordance with the rule of FIGS. 6A and 6B, a particular counter is identified and incremented each time a GetBlob Event 602 occurs having a given BlobSize and a given Duration. Additionally, the rule specifies that an average Duration is calculated for each BlobSize interval.

Figure 7A:
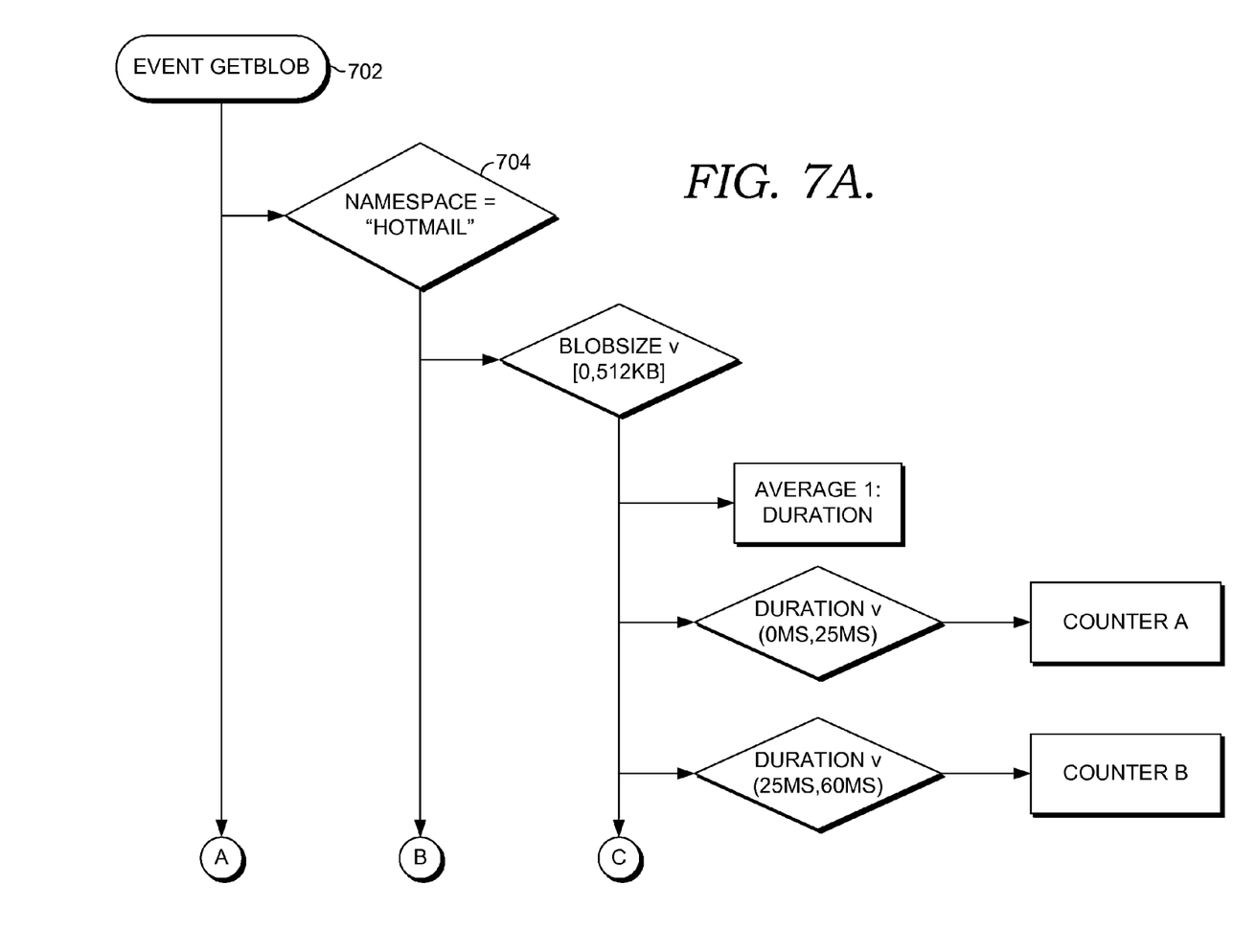
Figure 7B:
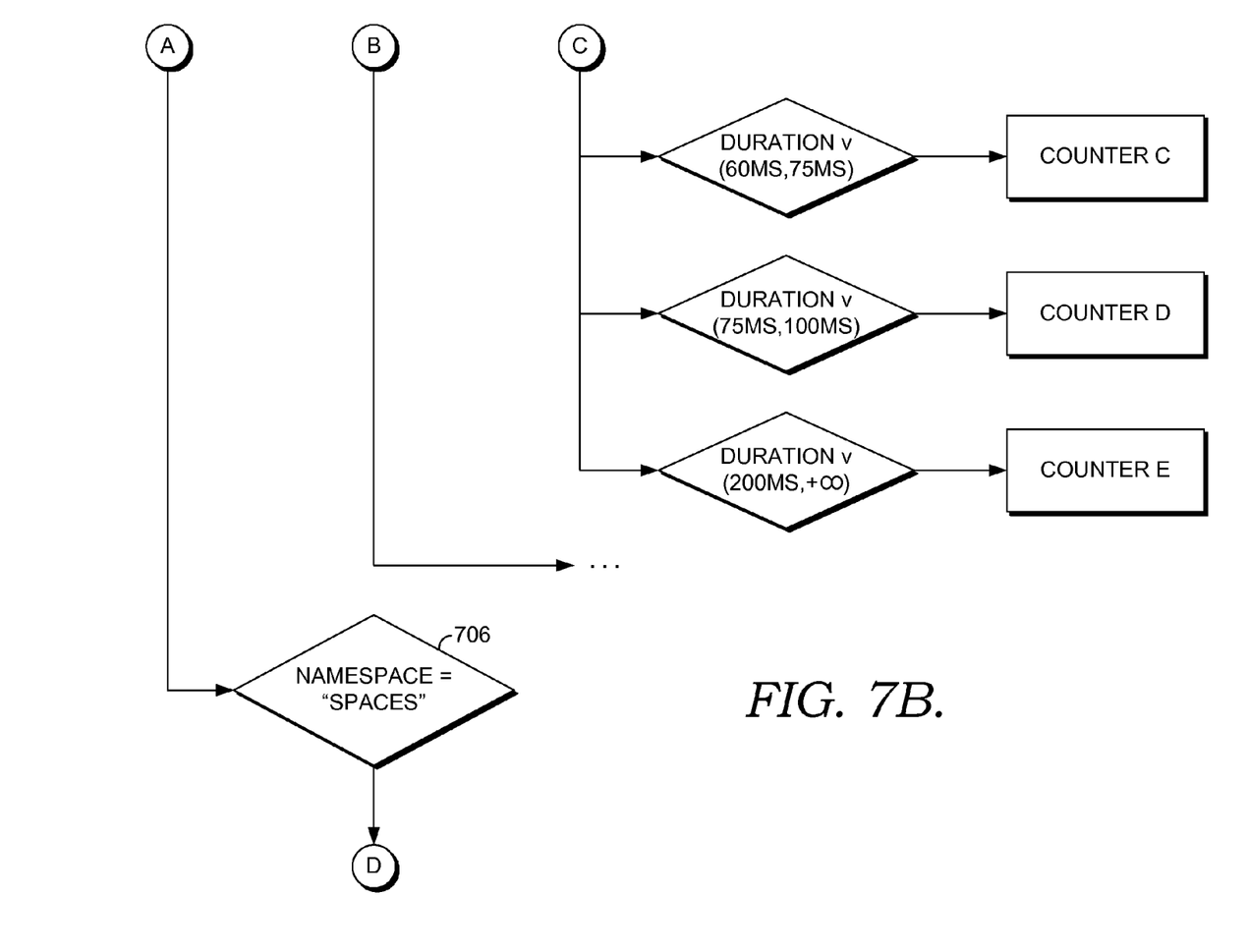
Figure 7C:
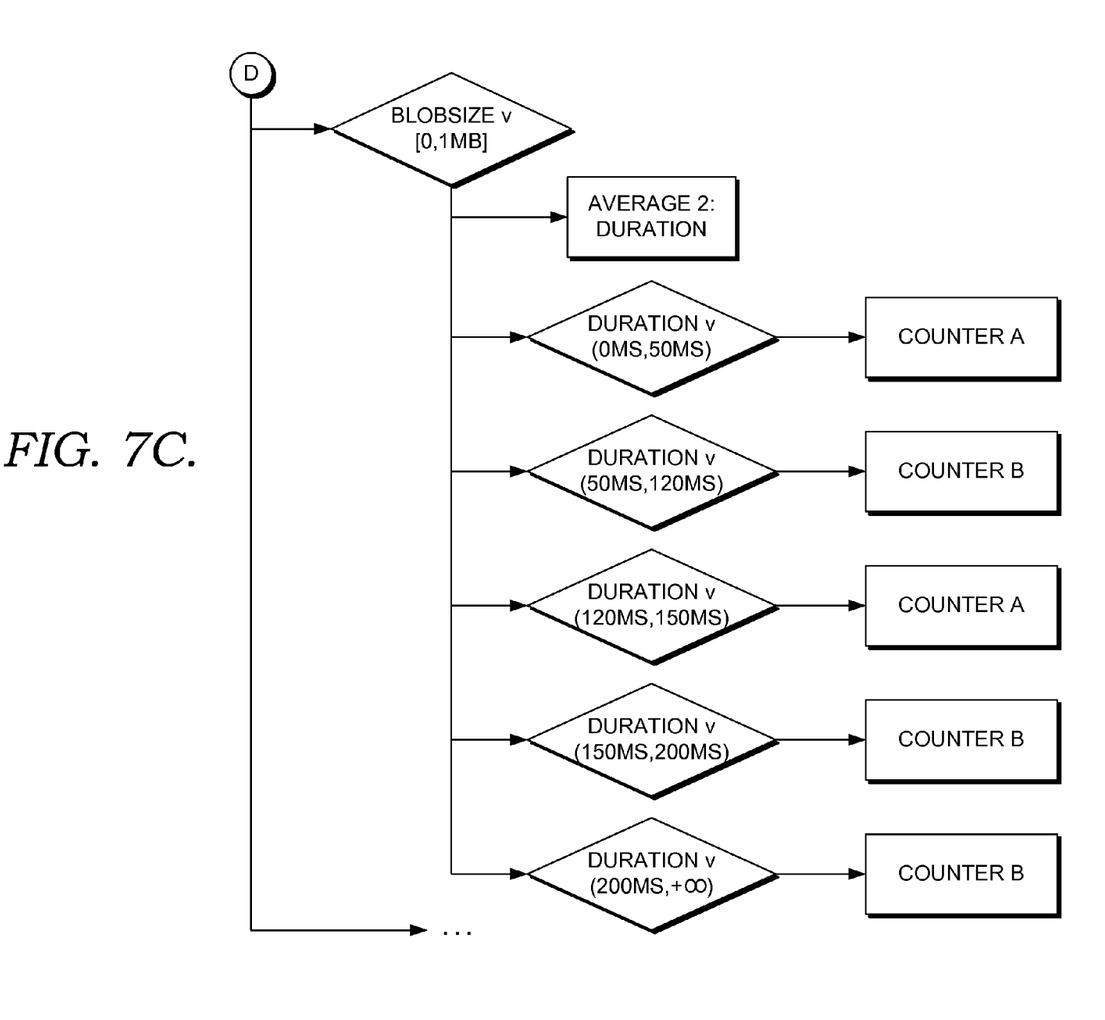

Next, FIGS. 7A through 7C illustrate a rule that uses the parameter values for the Namespace property to collect aggregated measurement data for GetBlob events 702. The information collected is effectively the same as that collected in the example of FIGS. 6A and 6B. (e.g., average durations calculated and counters incremented for events within given BlobSize and Duration intervals). However, in the rule of FIGS. 7A through 7C, metrics are also broken up by distinct values of the Namespace. In other words, aggregated measurement data is generated for each identified namespace. For instance, in FIGS. 7A and 7C, the rule collects aggregated measurement data for the hotmail namespace 704 and the spaces namespace 706. Accordingly, in the example of FIGS. 6A and 6B, QoS metrics were tracked across all namespaces, while in the present example of FIGS. 7A through 7C, QoS metrics are tracked per-namespace.

Figure 8:
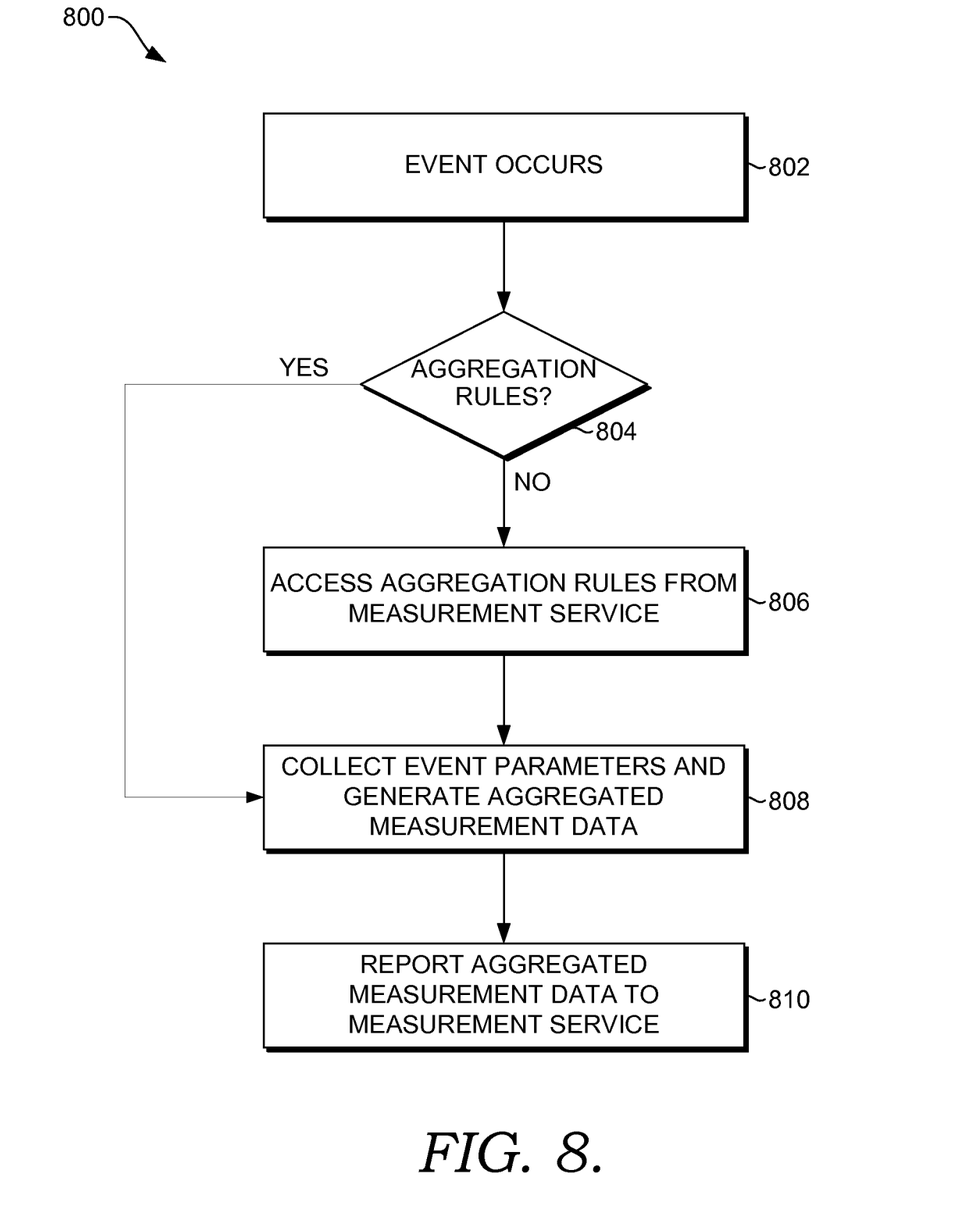
FIG. 8 is a flow diagram showing a method for tracking quality of service using a measurement client in accordance with an embodiment of the present invention.

Turning next to FIG. 8, a flow diagram is illustrated which shows a method 800 for a measurement client to track aggregated measurement data in accordance with an embodiment of the present invention. Initially, as shown at block 802, an event occurs within an event producer at a client device. The event is associated with some interaction with a distributed system such that it is desirable to track QoS metrics for the event.

As shown at block 804, a determination is made regarding whether aggregation rules associated with the event are available at the client device. For instance, in some cases, the measurement client may have previously accessed aggregation rules from a measurement service. In some embodiments, a set of aggregations rules are associated with the event producer that includes rules for aggregating data regarding events that may be produced by the event producer. The particular aggregation rules for the current event may be identified from that set.

Alternatively, if the aggregation rules are not available at the client device (or potentially if the aggregation rules are older than a predetermined age), the measurement client requests the aggregation rules for the event (or for all events for the event producer) from the measurement service, as shown at block 806. In some embodiments, the event will correspond with an event service name. In such embodiments, the measurement client may employ DNS to resolve the event service name to a location of the measurement service from which the aggregation rules should be retrieved for the current event. In some embodiments, the client accesses aggregation rules from the measurement service by providing an identity of the event producer.

After it is determined the aggregation rules are already available at the client device or the measurement client retrieves the aggregations rules from the measurement service, the measurement client generates aggregated measurement data based on event parameters collected from the event, as shown at block 808. The measurement client then reports the aggregated measurement data to the measurement service. The time at which the measurement client reports the aggregated measurement data may vary in different embodiments. For instance, in some embodiments, the aggregated measurement data may be reported to the measurement service at a given reporting interval, which may be specified in an event configuration maintained at the measurement service.

Figure 9:
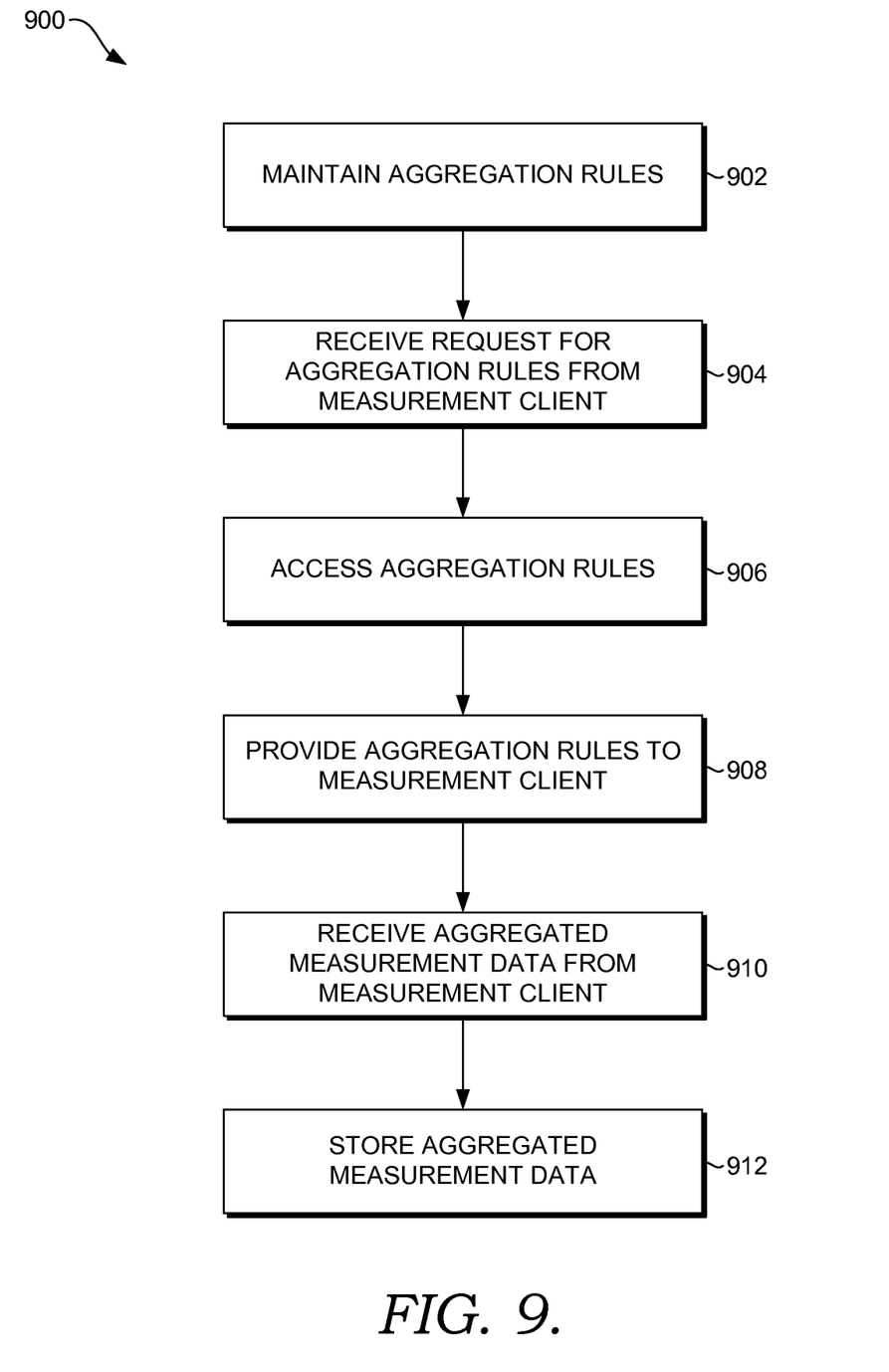
FIG. 9 is a flow diagram showing a method for a measurement service providing aggregation rules to and collecting client-side quality of service metrics from a measurement client in accordance with an embodiment of the present invention.

Referring next to FIG. 9, a flow diagram is provided illustrating a method 900 for a measurement service to publish aggregation rules to and receive aggregated measurement data from a measurement client in accordance with an embodiment of the present invention. As shown at block 902, the measurement service maintains aggregation rules. In various embodiments of the present invention, the measurement service may maintain aggregation rules for a given type of event or for multiple events for a given event producer. As discussed previously, the aggregation rules may include information, such as rules for a measurement client to aggregate event parameters to generate aggregated measurement data, reporting intervals, and how the measurement service should handle received aggregated measurement data.

The measurement service receives a request for aggregation rules from a measurement client, as shown at block 904. Based on the request, the measurement service accesses the aggregation rules at block 906. As noted previously, in some embodiments, the measurement service may maintain event configurations for several types of events or several types of event producers. In such embodiments, the request from the measurement client may provide information that allows the measurement service to identify the appropriate aggregation rules to satisfy the request from the measurement client.

The measurement service provides the aggregations rules to the measurement client, as shown at block 908, in response to the request. The measurement client may then use those aggregation rules to generate aggregated measurement data based on events at the client. The measurement service receives aggregated measurement data from the measurement client at block 910. The aggregated measurement data is then stored, as shown at block 912.

As can be understood, embodiments of the present invention provide for server-side control of client-side tracking and reporting of QoS and other aggregated measurement data. The present invention has been described in relation to particular embodiments, which are intended in all respects to be illustrative rather than restrictive. Alternative embodiments will become apparent to those of ordinary skill in the art to which the present invention pertains without departing from its scope. For example, embodiments can be used to collect server-side QoS and other data as well if the servers are also using the measurement client.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for tracking, at a client device, aggregated measurement data regarding interaction between the client device and a distributed system, the method comprising:
   identifying, on the client device, the occurrence of an event involving interaction between the distributed system and the client device in which the distributed system provides a service to the client device;
   accessing, on the client device, one or more aggregation rules for generating aggregated measurement data for the event, wherein the one or more aggregation rules are provided to the client device from at least one server device and specify which event parameters to collect for the event on the client device and how the client device is to aggregate the event parameters to generate the aggregated measurement data;
   collecting, on the client device, the event parameters from the event at the client device as specified by the one or more aggregation rules, wherein the event parameters comprise data regarding the interaction between the distributed system and the client device in which the distributed system provides the service to the client device;
   generating, on the client device, aggregated measurement data by aggregating at least a portion of the event parameters in accordance with the one or more aggregation rules; and
   communicating the aggregated measurement data from the client device for server-side storage.

2. The method of claim 1, wherein accessing the one or more aggregation rules comprises:
   determining that the one or more aggregations rules have previously been received and stored by the client device; and
   accessing the one or more aggregation rules stored at the client device.

3. The method of claim 1, wherein accessing the one or more aggregation rules comprises:
   determining that the one or more aggregation rules are not currently available at the client device;
   requesting the one or more aggregation rules from the at least one server; and
   receiving the one or more aggregation rules from the at least one server.

4. The method of claim 3, wherein requesting the one or more aggregation rules from the at least one service comprises:
   determining an event service name for the event; and
   using DNS to resolve the event service name to a location for the at least one server device.

5. The method of claim 1, wherein the one or more aggregation rules comprise a tree of conditions and nodes with instructions for calculating aggregated measurement data and wherein generating the aggregated measurement data comprises:
   traversing the tree of conditions based on conditions that are satisfied by the event to identify nodes attached to satisfied conditions; and
   calculating the aggregated measurement data based on instructions corresponding with nodes attached to the satisfied conditions.

6. The method of claim 1, wherein generating the aggregated measurement data comprises updating previously collected aggregated measurement data using the one or more event parameters from the event in accordance with the one or more aggregation rules.

7. The method of claim 1, wherein the method further comprises storing the aggregated measurement data at the client device until a reporting period specified by the one or more aggregation rules has expired.

8. The method of claim 7, wherein communicating the aggregated measurement data to at least one server device comprises determining that the reporting period has expired.

9. The method of claim 7, wherein the method further comprises updating the aggregated measurement data stored at the client device based on event parameters collected from at least one subsequent event.

10. The method of claim 1, wherein the method further comprises:
    updating the one or more aggregations rules with one or more new aggregation rules from the at least one server device to generate one or more updated aggregation rules;
    collecting event parameters from a new event;
    generating additional aggregated measurement data based on the event parameters from the new event in accordance with the one or more updated aggregation rules; and communicating the additional aggregated measurement data for server-side storage.

11. The method of claim 1, wherein the event is a cluster event that is associated with a particular server cluster.

12. The method of claim 1, wherein the event is a global event that is not associated with a particular server cluster.

13. One or more computer-storage media devices embodying computer-useable instructions that, when used by a server device, causes the server device to perform a method comprising:
receiving a request from a client device for one or more aggregation rules for generating aggregated measurement data for an event at the client device, the event involving interaction between a distributed system and the client device in which the distributed system provides a service to the client device;
accessing one or more aggregation rules for the event, the one or more aggregation rules specifying event parameters to collect for the event at the client device and how the client device is to aggregate the event parameters to generate the aggregated measurement data, wherein the event parameters comprise data regarding the interaction between the distributed system and the client device in which the distributed system provides the service to the client device;
communicating the one or more aggregation rules to the client device;
receiving aggregated measurement data for the event from the client device, wherein the client device generated the aggregated measurement data by aggregating event parameters collected from the event as specified by the one or more aggregated rules and manipulated in accordance with the one or more aggregation rules; and
storing the aggregated measurement data.

14. The one or more computer-storage media devices of claim 13, wherein the server device maintains a plurality of sets of aggregations rules for a plurality of different types of event producers producing events at client devices and wherein accessing the one or more aggregations rules for the event comprises determining a set of aggregation rules corresponding with an event producer producing the event at the client device.

15. The one or more computer-storage media devices of claim 13, wherein the one or more aggregation rules specify a collection interval over which events are aggregated at the client device.

16. The one or more computer-storage media devices of claim 13, wherein the one or more aggregation rules specify a reporting interval indicating a frequency with which aggregated measurement data is reported from the client device to the server device.

17. The one or more computer-storage media devices of claim 13, wherein one or more aggregation rules specify information regarding how aggregated measurement data received from the client device is stored.

18. The one or more computer-storage media devices of claim 13, wherein storing the aggregated measurement data comprises providing the aggregated measurement data to a datastore service, wherein the datastore service stores the aggregated measurement data in a datastore.

19. A system providing client-side event tracking, the system comprising:
at least one server device including a measurement service, the measurement service having access to an event configuration including one or more aggregation rules for generating aggregated measurement data at client devices, the one or more aggregation rules specifying event parameters to be collected by the client devices for events, how the clients are to aggregate the event parameters to generate aggregated measurement data, and a reporting period specifying a frequency with which aggregated measurement data is reported;
at least one client device including an event producer comprising an application or library that produces an event involving interaction with a distributed system in which the distributed system provides a service to the client device, the event having an event service name, the at least one client device also including a measurement client for tracking aggregated measurement data associated with the event from the event producer, wherein the measurement client uses DNS to resolve the event service name and identify the server device and communicates with the measurement service to access the one or more aggregation rules, wherein the measurement client collects event parameters from the event as specified by the one or more aggregation rules and generates aggregated measurement data by aggregating the event parameters in accordance with the one or more aggregation rules, wherein the event parameters comprise data regarding the interaction between the distributed system and the client device in which the distributed system provides the service to the client device, and wherein the measurement client communicates the aggregated measurement data to the measurement service based on the reporting period in the event configuration.

20. The system of claim 19, wherein the event configuration further includes information specifying how the measurement service handles QoS metrics received from the client device.

* * * * *